J. OPPERUD.
ANIMAL TRAP.
APPLICATION FILED MAR. 17, 1910.

1,016,170.

Patented Jan. 30, 1912.

2 SHEETS—SHEET 1.

Witnesses

Inventor
Joseph Opperud.
By
Attorneys.

J. OPPERUD.
ANIMAL TRAP.
APPLICATION FILED MAR. 17, 1910.
1,016,170.
Patented Jan. 30, 1912.
2 SHEETS—SHEET 2.
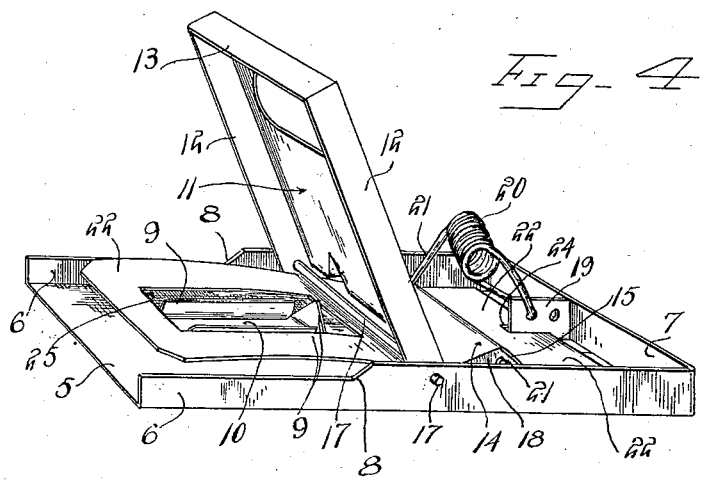
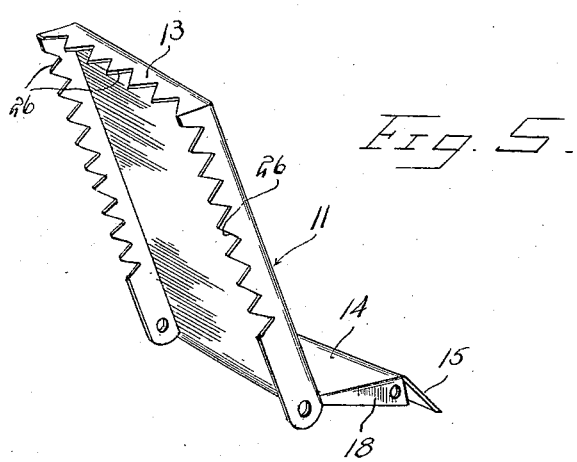
Witnesses
Inventor
Joseph Opperud.
By
Attorneys

UNITED STATES PATENT OFFICE.

JOSEPH OPPERUD, OF MADISON, SOUTH DAKOTA.

ANIMAL-TRAP.

1,016,170.  Specification of Letters Patent.  Patented Jan. 30, 1912.

Application filed March 17, 1910. Serial No. 549,863.

*To all whom it may concern:*

Be it known that I, JOSEPH OPPERUD, a citizen of the United States, residing at Madison, in the county of Lake, State of South Dakota, have invented certain new and useful Improvements in Animal-Traps; and I do hereby declare the following to be a full, clear, and exact description of the invention, such as will enable others skilled in the art to which it appertains to make and use the same.

The invention relates to an animal trap, and more particularly to the class of spring set animal traps.

The primary object of the invention is the provision of a trap which is as near automatic as possible in action and that will operate with the greatest possible ease and simplicity, eliminating all danger of the trap snapping the operator's fingers in the act of setting and almost admitting of the animal being released without the necessity of being touched by the operator.

Another object of the invention is the provision of a trap which may be easily and quickly baited and also that will permit the admission of a large bait without affecting the trigger or tripper of the trap.

Another object of the invention is the provision of a trap of this character in which the jaw for trapping the animal is susceptible of quick operation by reason of the tension of a spring connected therewith so that the trapping of the animal is positively assured without any possibility of the subsequent escape of the animal from the said trap.

A further object of the invention is the provision of a trap wherein the force of the jaw member is adjustable to increase or decrease its striking power when in operation for trapping the animal.

A still further object of the invention is the provision of a trap of this character which is simple in construction, thoroughly reliable and efficient in operation and inexpensive to manufacture.

With these and other objects in view the invention consists in certain novel features of construction, combination and arrangement of parts as hereinafter more fully described, illustrated in the accompanying drawings disclosing the preferred forms of embodiment of the invention and pointed out in the claims hereunto appended.

Figure 1:
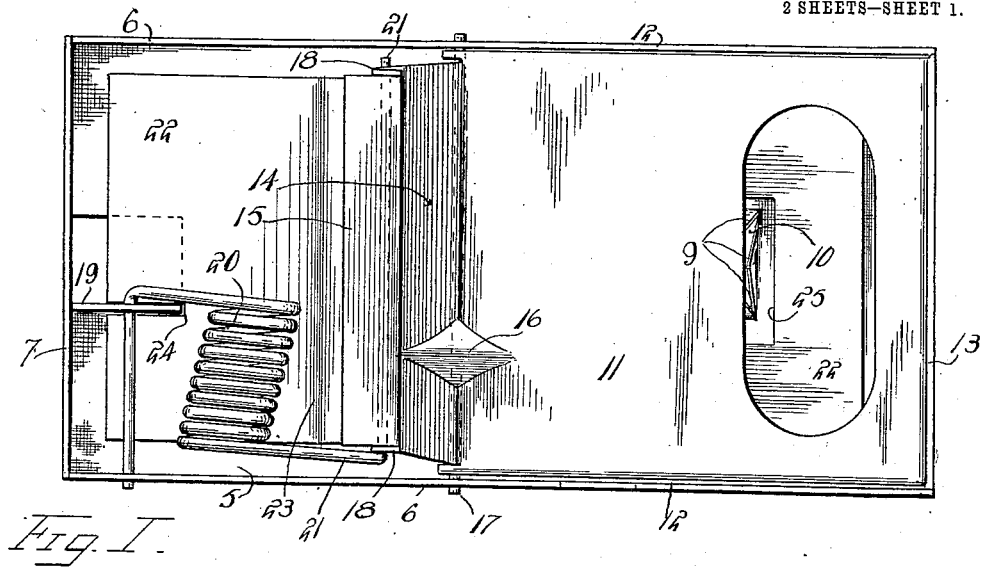
Figure 2:
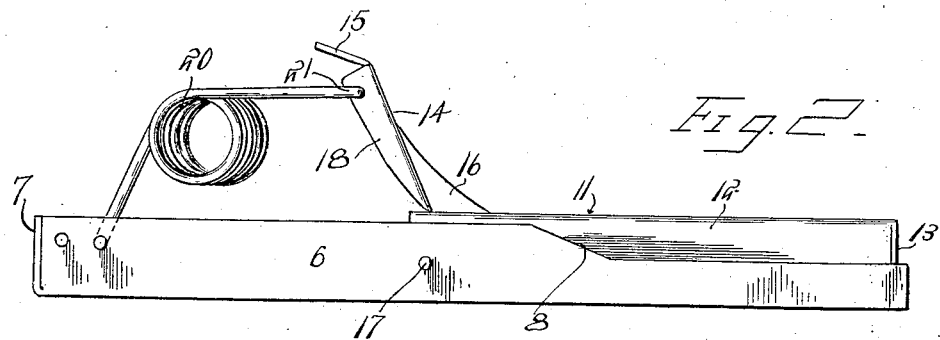
Figure 3:
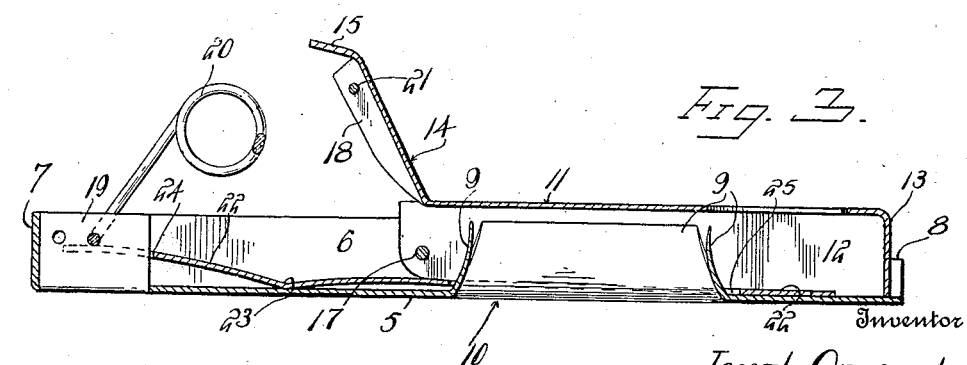

In the drawings:—Figure 1 is a top plan view of a trap constructed in accordance with the invention. Fig. 2 is a side elevation thereof, the trap being shown with its jaw in closed position. Fig. 3 is a vertical longitudinal sectional view through the trap. Fig. 4 is a perspective view of the trap, the same being shown in open position. Fig. 5 is a perspective view of a slight modification of the jaw of the trap.

Similar reference characters indicate corresponding parts throughout the several views in the drawing.

Referring to the drawings by numerals 5 designates a flat elongated base, the same being bent at its opposite longitudinal edges to provide upstanding or vertical side flanges 6, while one end of the said base is upturned to provide a vertical end wall or flange 7 with the opposite end of the base open. The vertical side flanges 6 of the base at its open end are cut away to provide shallow portions 8 at the open end. Formed on or cut from the base 5 near its open end are upturned lips 9 providing a rectangular shape bait receiving cavity or recess 10 in the said base.

Connected with the base is a rocking striker member or jaw comprising a plate 11 having depending right-angular side edges 12 and a front depending end edge 13, the said plate 11 being bent near its rear end to provide an upturned substantially right-angular extension 14 provided with a rearwardly bent adjustable abutment lip or tongue 15, the purpose of the adjustability of this tongue or lip being hereinafter more fully described. At the bight of the extension 14 and struck in from one face of the plate is a strengthening or reinforcing rib or bulged portion 16 whereby the said extension 14 will be maintained rigid with relation to the plate.

The plate 11 is connected to the base by means of a pivot pin 17 passed through suitable openings in the side edges 12 of the plate and the side flanges 6 of the base so that the said plate may be swung on its pivot pin 17 for the setting and trapping operation of the device.

Formed integral with the extension 14 at opposite side edges thereof are bearing ears 18 the latter projecting from one face of the extension at right angles thereto. Struck from the base 5 at its rear end is an upturned bearing ear or lug 19 containing a series of suitable apertures which aline with other suitable apertures in one side flange 6 of the base and detachably engaging a pair of these alining apertures is one laterally bent extremity of a coiled tensioned spring 20 the same being pivotally connected at its oppositely bent laterally projecting end 21 to the bearing ears 18 on the extension 14 of the plate. It will be apparent that the pivoted end 21 of this spring will be positioned above the axis of movement of the jaw when in closed relation to the base and on the raising of the said jaw to opened position it will shift the pivoted end 21 of the spring to a point below the axis of movement of the jaw, so that the jaw will be maintained by the tension of the spring in either closed or opened position.

Superimposed upon the base 5 is a tripping member comprising a plate 22, the same being formed near its rear end with a transverse indentation or channel forming a fulcrum 23 projecting from the under face of the plate 22 and contacting with the upper face of the base, so that the said plate 22 is susceptible of slight rocking movement on the base. The rear end of this plate 22 is provided with a slot 24 receiving the upstanding lug 19 which latter serves to prevent lateral displacement of the said plate 22. The plate 22 is further provided with an elongated opening 25 near its forward end, the same being in register with the bait cavity or recess 10, so that bait therein will be exposed above the plate 22, whereby an animal may have access thereto. The jaw being brought to raised position the abutment lip or tongue 15 will contact with the rear end portion of the plate 22 causing it to rock on its fulcrum whereby the forward end portion of the plate 22 will become slightly elevated above the base 5 so that should an animal tread upon the forward end of the plate 22 it will result in the lowering of its forward end thereby initially rocking the jaw which will be automatically closed by the tensioned spring connected thereto and to the base.

The tongue 15 may be bent so as to vary its angular disposition with respect to the extension 14 so that the rocking jaw will be more susceptible to closing movement by the action of the tensioned spring 20, or in other words a slight depression of the trip member will serve to effect the instant closing of the jaw on the base.

It is of course to be understood that the device may be constructed entirely of metal or partly of metal and partly of wood or of any other suitable material, and may be of any required size to trap animals of various species, but is more particularly designed for use in trapping mice.

In Fig. 5 there is shown a slight modification wherein the jaw is provided with a plurality of teeth 26 cut into the depending side edges 12 and the front depending edge 13 of the plate 11 forming the jaw of the device. These teeth 26 will aid in more firmly holding the animal in the trap when caught by the closing jaw and thus reducing the chances of the escape of said animal to a minimum.

What is claimed is:—

1. An animal trap comprising a base having an inwardly directed support, a trip plate directed downwardly intermediate the ends and poised thereby upon the base and with a cleft bearing around said support and prevented thereby from lateral movement, a striker mounted to swing upon said base, and a spring connected at one end to said inwardly directed support and at the other end to said striker, said striker being adapted to be supported in an elevated position and released for movement to a closed position by operation of the trip plate.

2. An animal trap comprising a base, spaced supports rising from said base, a striker member with a portion extending at an angle to the longitudinal plane thereof, a spring having its terminals bent laterally, one of said spring terminals being connected to the angular projection of the striker and the other spring terminal extending through the base supports and trip means for said striker member, said spring serving to hold said striker in an elevated position and in contact with the trip plate and adapted to move said striker toward the base upon actuation of the trip member.

3. An animal trap comprising a base having an inwardly directed support, a trip plate directed downwardly intermediate its ends and poised thereby upon the base and with a cleft bearing around said support and operating to prevent lateral movement of the plate, a striker having a portion extended at an angle to the longitudinal plane thereof and with perforated ears, and a spring having its terminals bent laterally with one of said spring terminals extending through the perforated ears and the other spring terminal extending through the base supports, said spring holding said striker in an open position when the angular portion is in contact with the trip plate and adapted to move the same to a closed position when the angular portion is raised.

4. An animal trap comprising a base having upturned sides and with an inwardly directed support, a trip plate directed downwardly intermediate the ends and poised thereby upon the base between the sides thereof and with a cleft bearing around the support, a striker mounted to swing between the sides of said base and with downturned edges adapted to engage between the sides of the base and the trip plate, said striker having a portion extending at an angle to the longitudinal plane thereof, a spring connected to said base at one end and at the other end to the striker, said spring holding said striker in an elevated position for release by the trip plate.

In testimony whereof, I affix my signature, in presence of two witnesses.

JOSEPH OPPERUD.

Witnesses:
  M. T. WIELER,
  D. F. MACKAY.

Copies of this patent may be obtained for five cents each, by addressing the "Commissioner of Patents, Washington, D. C."